UNITED STATES PATENT OFFICE.

CHARLES WILLMOTT, OF SMETHWICK, ENGLAND.

SOLDER FOR ALUMINIUM.

1,078,114.　　　Specification of Letters Patent.　　Patented Nov. 11, 1913.

No Drawing.　　Application filed August 30, 1912.　Serial No. 717,843.

*To all whom it may concern:*

Be it known that I, CHARLES WILLMOTT, a subject of His Majesty the King of Great Britain and Ireland, residing at 124 Park road, Bearwood, Smethwick, in the county of Stafford, England, have invented new and useful Improvements in Solder for Aluminium, of which the following is a specification.

This invention consists of the herein described improved solder for soldering without the use of flux aluminium to aluminium or for soldering aluminium to other metals. When aluminium is soldered by my said solder the soldered joints are practically unaffected by time or by exposure to the atmosphere, or by immersion in rainwater and are as strong as any other parts of the aluminium article which are of the same sectional area.

My improved solder is a composition of the two metals tin and bismuth preferably in about the following proportions, namely approximately 86% of tin and 14% of bismuth. These are melted together so as to be thoroughly mixed and the solder is cast into strips or otherwise formed in convenient pieces for use. The said solder composed in the above stated proportions of tin and bismuth is for general use, but for those cases where the solder is required to be extra hard then the proportion of the bismuth to the tin must be slightly increased according to the degree of hardness required, and in cases where the solder is required to be very soft then the proportion of the bismuth to the tin must be diminished.

In using the solder above described no flux is necessary but the surface of the aluminium where the solder is required to adhere should be scraped clean simultaneously with the running of the solder thereon. This can be accomplished by an ordinary hard soldering gas blow pipe with a scraper like tool suitably held and heated by the blow pipe and adapted to simultaneously scrape the surface and lead the melted solder along the same.

My experiments show that the solder above described is not a mere coating to the aluminium but actually amalgamates therewith.

What I claim as my invention and desire to secure by Letters Patent is:—

A solder for aluminium composed of a mixture of tin and bismuth in the proportion of approximately 86% tin to 14% of bismuth.

In testimony whereof I have signed my name to this specification in the presence of two subscribing witnesses.

CHARLES WILLMOTT.

Witnesses:
　CHARLES BOSWORTH KETLEY,
　BERTHA MATILDA DEELEY.